(12) United States Patent
Morken

(10) Patent No.: US 10,974,637 B2
(45) Date of Patent: Apr. 13, 2021

(54) CONTAINER STABILIZING APPARATUS

(71) Applicant: Dennis George Morken, Sylvan Lake (CA)

(72) Inventor: Dennis George Morken, Sylvan Lake (CA)

( * ) Notice: Subject to any disclaimer, the term of this patent is extended or adjusted under 35 U.S.C. 154(b) by 86 days.

(21) Appl. No.: 16/223,094

(22) Filed: Dec. 17, 2018

(65) Prior Publication Data
US 2020/0189444 A1 Jun. 18, 2020

(51) Int. Cl.
*B60P 7/08* (2006.01)

(52) U.S. Cl.
CPC ........... *B60P 7/0823* (2013.01); *B60P 7/0807* (2013.01); *B60P 7/0892* (2013.01)

(58) Field of Classification Search
CPC ..... B60P 7/0823; B60P 7/0876; B60P 7/0807; B60P 7/135; B60P 3/40; B60P 7/06; B60P 7/0815; B60P 7/0892; B60P 3/079; B60P 7/08
USPC ....... 410/97, 98, 118, 106, 100, 99, 94, 8, 7, 410/46; 156/247, 277, 308.2, 60; 244/118.1, 118.2
See application file for complete search history.

(56) References Cited

U.S. PATENT DOCUMENTS

| 4,525,113 A * | 6/1985 | Colman | B65D 71/04 410/32 |
| 5,584,623 A * | 12/1996 | Nadherny | B60P 7/0869 410/155 |
| 5,980,173 A * | 11/1999 | Danekas | B60P 7/0869 410/41 |
| 8,459,912 B2 * | 6/2013 | Siegenthaler | B60P 7/0815 410/100 |
| 8,459,914 B2 * | 6/2013 | Tatina | B60P 7/0823 410/100 |
| 2007/0258785 A1 * | 11/2007 | Wiebe | B61D 45/002 410/98 |
| 2009/0245963 A1 * | 10/2009 | Schoor | B60R 7/043 410/97 |
| 2013/0230362 A1 * | 9/2013 | Stromberg | B60P 7/06 410/97 |

* cited by examiner

*Primary Examiner* — D Glenn Dayoan
*Assistant Examiner* — Sunsurraye Westbrook
(74) *Attorney, Agent, or Firm* — Capehart Law Firm

(57) ABSTRACT

A securing apparatus for a container being transported, with the container having four side walls and two end walls with the side walls and end walls meeting at edges that intersect at eight corners with each corner being the convergence of three edges. The apparatus having a container stabilizing base and a strap securing base. The container stabilizing base having a first L-shaped arm extending along a first edge of the container, a second L-shaped arm extending along a second edge of the container and a third L-shaped arm extending along a third edge of the container. The first, second and third L-shaped arms are interconnected such the container stabilizing base in positioned about and against one of the eight corners. The L-shaped arms having two legs which are configured to be positioned against two adjected container walls. The strap securing base is affixed to the container stabilizing base. The strap securing base having a plurality of guide walls extending along opposing peripheral edges of the strap securing base to define a strap receiving channel together with the strap securing base for receiving a securing strap.

8 Claims, 8 Drawing Sheets

CONTAINER STABILIZING APPARATUS

BACKGROUND OF THE INVENTION

Field of the Invention

The present invention generally relates to container transportation stabilization, and more particularly, to an apparatus attachable to the corner of a container and configured to receive a securing strap such that the container will be secure and stabilize during transportation.

Background

Square and rectangular containers are used regularly with the transportation of items. Multiple modes of transportation, such as commercial flatbed trucks, railway cars and pickup trucks, may be used to transport these containers. When transported, securing straps are commonly used to secure the container. However, these straps are usually placed around the sides of the container. This placement does not always prevent movement of the container due to wind, vibration of the vehicle or other factors. Thus, there is a need to stabilize a square/rectangular container from movement during transportation.

Efforts in the prior art have been mostly directed toward the protection of an edge of a box that does not prevent the aforementioned movement. For example, U.S. Pat. No. 7,407,353 discloses strap chafe protector having a molded base having a first base section and a second base section arranged at an obtuse angle to that the base. U.S. Pat. No. 7,677,849 discloses a cargo guard that is coupled to a strap and can be repositioned along the strap. U.S. Pat. No. 9,221,382 discloses an edge guard to provide a barrier between a strap and a load. U.S. Pat. No. 4,938,357 discloses a corner-angle edge protector having a strapping-band passage opening which is open via a slot towards an adjacent edge of the protector. This piece of prior art is typical of a "corner-edge" device which while states it is a corner protector, it is in reality it is an edge protector and does not protect the corners of the containers.

SUMMARY

In view of the foregoing disadvantages inherent in the known container support and stabilization art, the present disclosure provides a novel container stabilization apparatus.

A container securing apparatus for containers is disclosed. For purposes of this invention, a container is a standard box-type container having four side walls and two end walls with the side walls and end walls meeting at edges that intersect at eight corners with each corner being the convergence of three edges.

One aspect of the apparatus includes a container stabilizing base and a strap securing base. The container stabilizing base is positioned at one of the eight corners of the container and has three stabilizing arms extending away from the corner and along the three edges that extend away from the corner of the container. The extending arms intersect to form a corner portion which is located at the corner of the container. Each stabilizing arm has two legs in a L-shaped configuration such that the two legs are positioned against two adjected container walls.

The strap securing base is affixed to the container stabilizing base. In this aspect, the base may be in a rounded configuration that is position over the corner portion of the stabilizing base. The strap securing base has a plurality of guide walls extending along opposing peripheral edges of the strap securing base to define a strap receiving channel together with the strap securing base for receiving a securing strap.

In some aspects of the invention, the strap securing base is formed from a rigid plastic. Further, the angle between the two legs of the stabilizing arms may be approximately 90°.

In some aspects of the present invention, the stabilizing arms may be perpendicular to each other. For example, the first stabilizing arm is perpendicular to the second stabilizing arm, the second stabilizing arm is perpendicular to the third stabilizing arm, and the third stabilizing arm is perpendicular to the first stabilizing arm.

In some aspects of the present invention, the strap securing base may be affixed to one leg of the one of the stabilizing arms.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

DRAWINGS

The figures which accompany the written portion of this specification illustrate embodiments for the present disclosure, a container stabilization apparatus, constructed and operative according to the teachings of the present disclosure.

DETAILS DESCRIPTION

Figure 1:
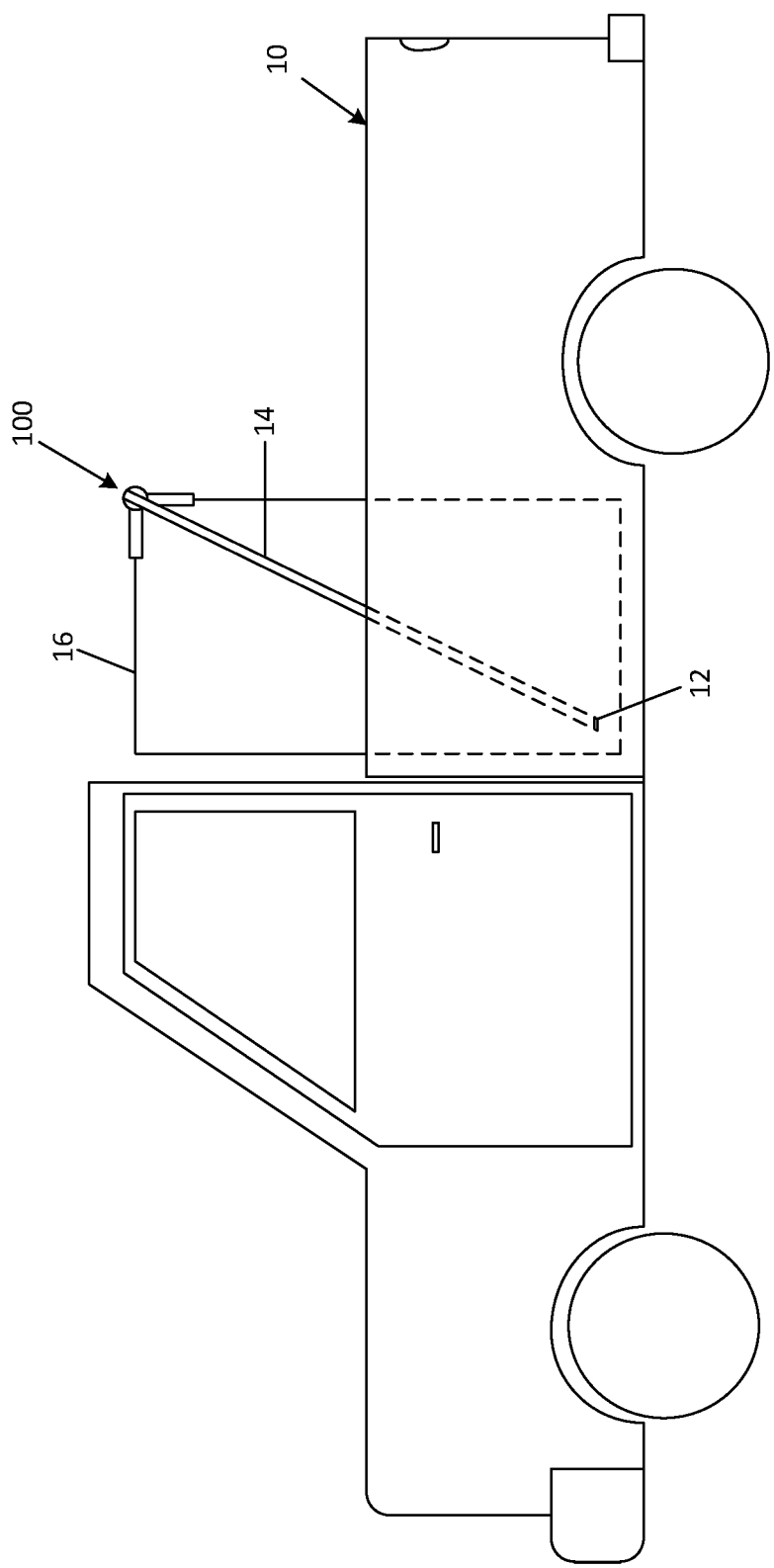
FIG. 1 is a perspective side view of an embodiment of the present invention in use.
Figure 2:
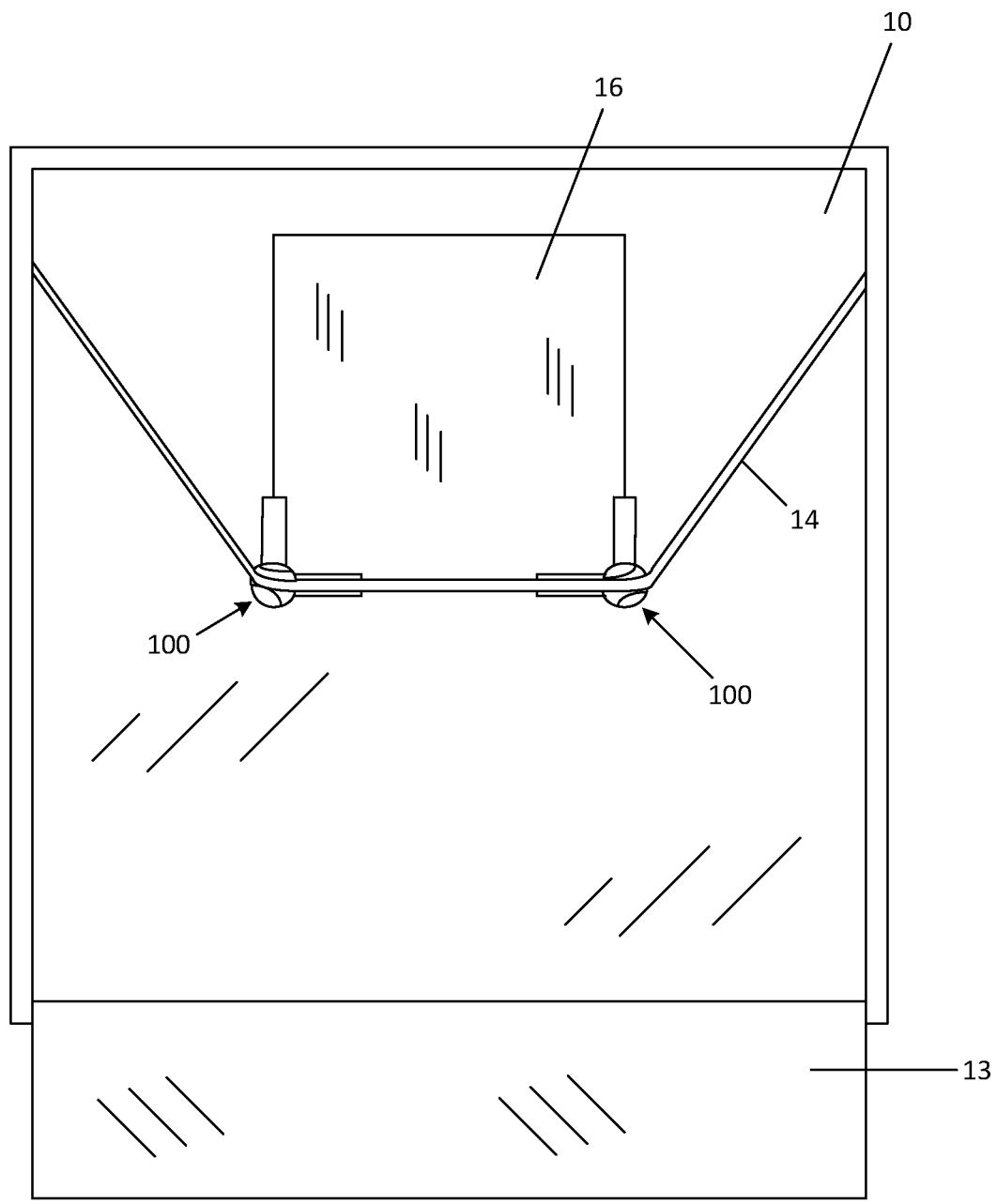
FIG. 2 is a perspective top view of an embodiment of the present invention in use.

As discussed above, embodiments of the present disclosure relate to a container stabilization and more particularly to a container stabilization apparatus for use with the transportation of containers.

Generally, a container securing apparatus is disclosed. For purposes of this invention a container is a box type container having four sidewalls and two end walls with the sidewalls and end walls meeting at edges that intersect at the corners with each corner being the convergence of three edges. The container securing apparatus is designed to secure and stabilize the container during transportation.

As illustrated in the Figures, a container 16 is placed within the back of a pickup bed 10 for transportation. Securing strap 14 are utilized to secure and stabilize container 16 during such transportation. In this embodiment, a container securing apparatus 100 is positioned at a corner of container 16 with a second container securing apparatus 100 being positioned at an opposite corner of container 16. Securing strep 14 engages the two containers securing apparatus and upon the tightening thereof thereby stabilizing and securing container 16 within pickup bed 10.

In this embodiment, container securing apparatus 100 includes a container stabilizing base 110 and a strap securing base 130. As illustrated, container stabilizing base 110 and securing strap base 134 of a unitary construction. However, container stabilizing base 110 and strap securing base 130 may be separate components attached to each other. Container securing apparatus 110 may be made from a rigid plastic, metal, or other material that is suitable for securing and stabilizing containers with the use of one or more securing straps.

Stabilizing base 110 includes three stabilizing arms 112, 114, 116 that extend outward from the corner of container 16 along the associated edges 22A, 22B, 22C, of container 16. Each stabilizing arm 112 114 116 intersect to form a corner portion which is located at the corner of container 16. Additionally, each stabilizing arm 112, 114, 116 has two legs in an L-shaped configuration such that the two legs are positioned against two adjacent container walls. In some embodiments, the angle between the two legs is approximately 90°. Also, in some embodiments, the three stabilizing arms 112 114 116 are configured such that they are perpendicular to each other. In other words, the first stabilizing arm 112 is perpendicular to the second stabilizing arm 114, the second stabilizing arm 114 is perpendicular to the third stabilizing arm 116, and the third stabilizing arm 116 is perpendicular to the first stabilizing arm 112.

Figure 3:
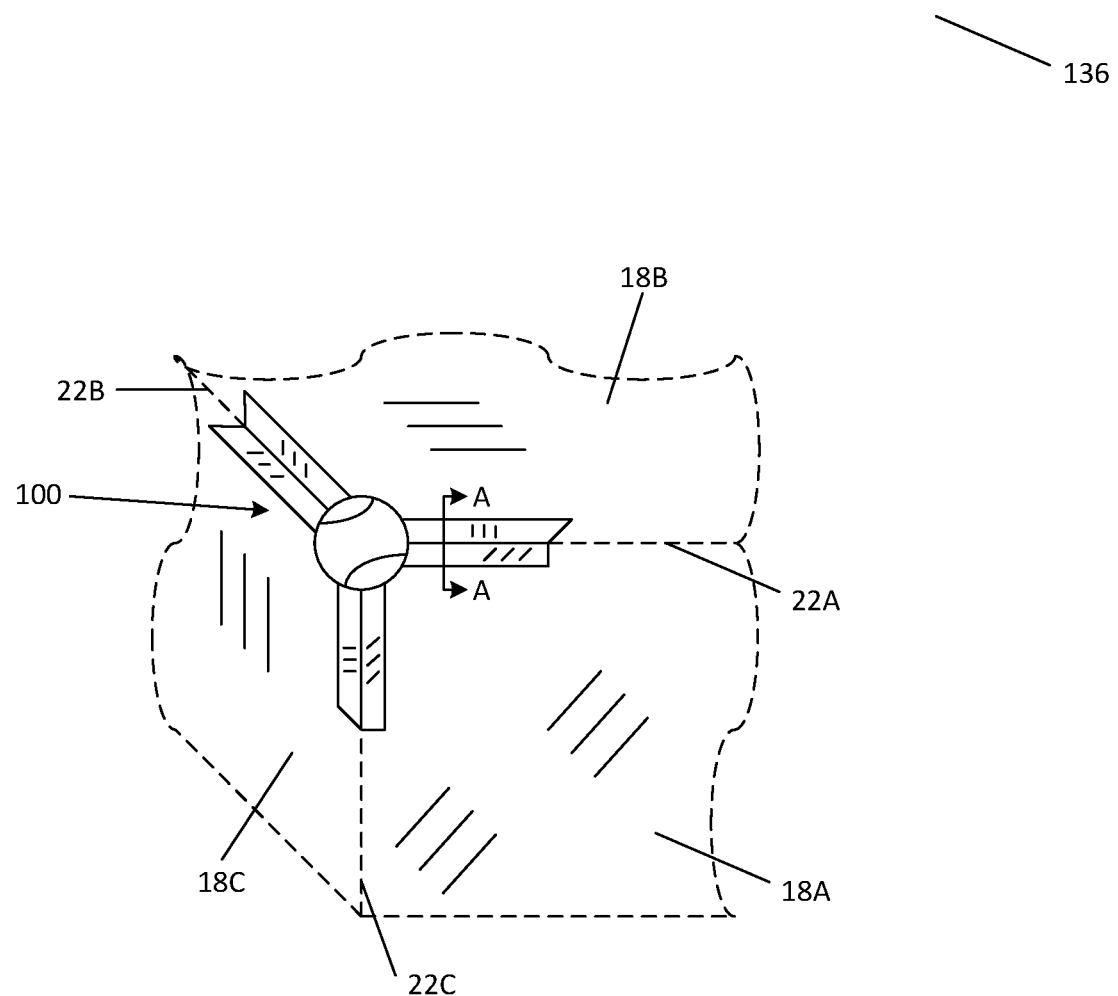
FIG. 3 is a perspective view of an embodiment of the present invention in use.
Figure 4:
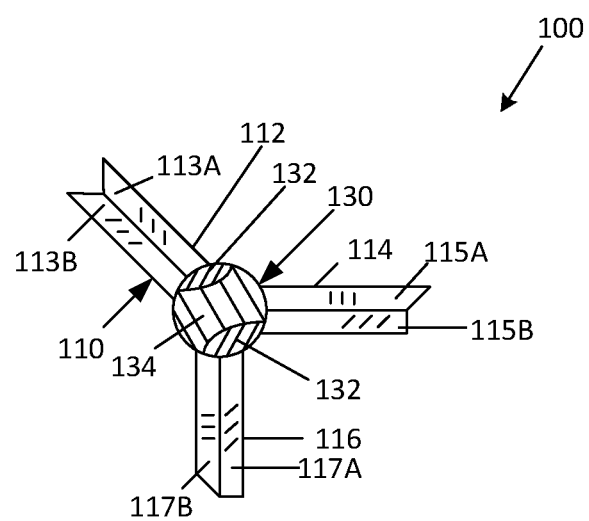
FIG. 4 is a perspective view of an embodiment of the present invention.
Figure 5:
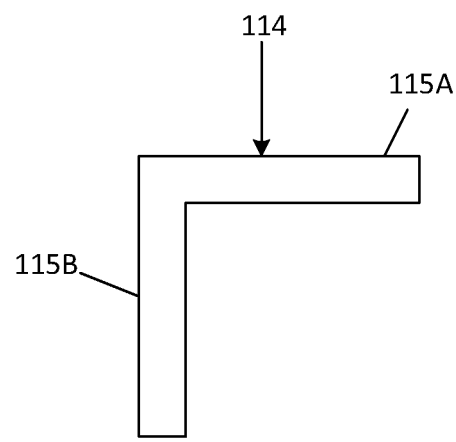
FIG. 5 is a cross-sectional view along line AA of the embodiment of an extension arm of the present invention of FIG. 3.
Figure 6:
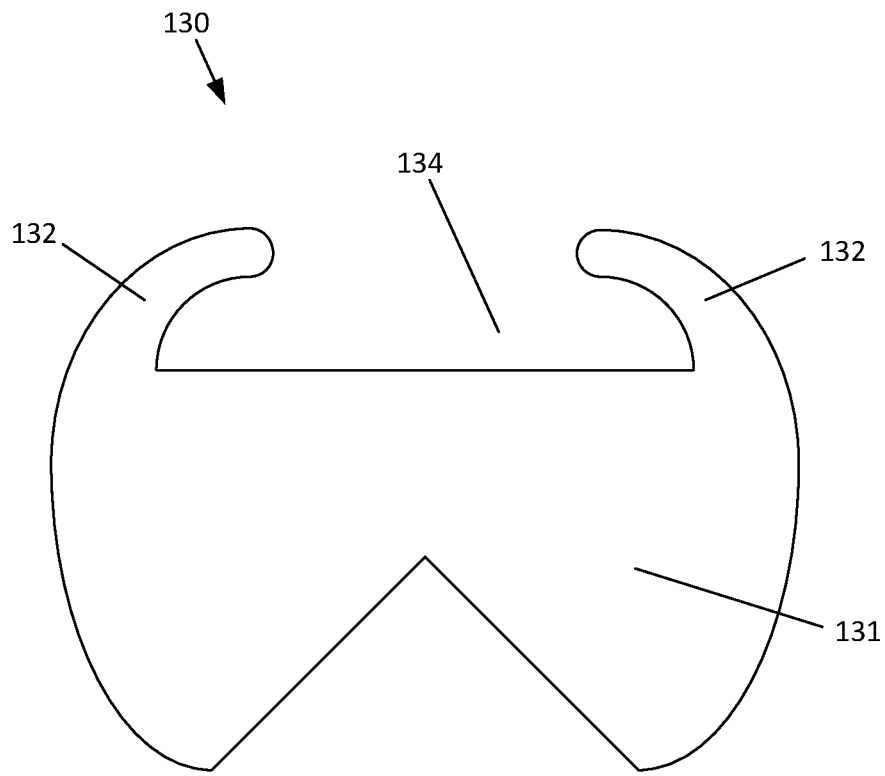
FIG. 6 is a cross-sectional view of an embodiment of a strap securing base of the present invention.

By way of example as illustrated in FIG. 3, container securing apparatus 100 is placed at a corner of container 16. A first stabilizing arm 112 extends along edge 22A of container 16. First stabilizing arm 112 has a first leg 113A and a second leg 113B. First leg 113A is configured to be positioned against end wall 20 while second leg 113B is configured to be positioned against side wall 18A. A second stabilizing arm 114 extends along edge 22B of container 16. Second stabilizing arm 114 has a first leg 115A and a second leg 115B. First leg 115A is configured to be positioned against end wall 20 while second leg 115B is configured to be positioned against side wall 18B. A third stabilizing arm 116 extends along edge 22C of container 16. Third stabilizing arm 116 has a first leg 117A and a second leg 117B. First leg 117A is configured to be positioned against side 18A while second leg 117B is configured to be positioned against side wall 18B.

In this embodiment, strap securing base 130 is in a rounded configuration and is positioned at the corner of container stabilizing base 110. While this embodiment illustrates strap securing base 130 in a rounded configuration and located at the corner of container stabilizing base 110, this is for illustrative purposes and those skilled in the art will recognize that other configurations will be within the scope of the present invention.

Strap securing base 130 includes a plurality of guide walls 132 that extend along proposing peripheral edges of strap securing base 130. Guide walls 132 together with strap securing base 130 define a strap receiving channel 134. In use, a securing strap 14 is placed within strep receiving channel 134 and held in place by guide walls 132 in combination with strap securing base 130. The angle of guild walls 132 to strap securing base 130, container securing apparatus 130 and container 16 is illustrative. Those skilled in the art will recognize that guild walls may be configured in various angles relative to strap securing base 130, container securing apparatus 100 and container 16, and as such, is within the scope of the present invention.

Figure 7:
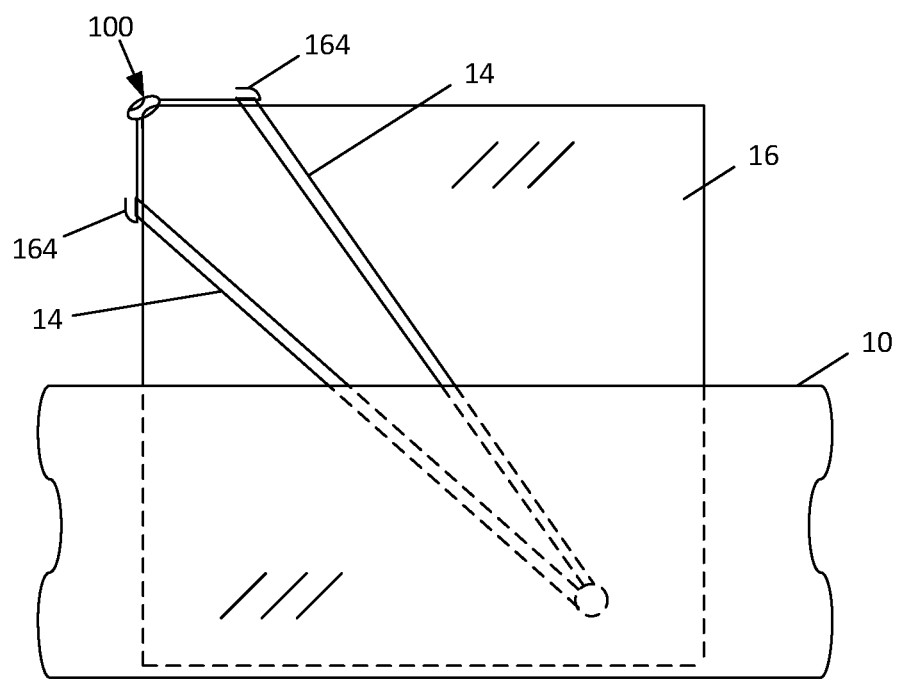
FIG. 7 is a perspective side view of an additional embodiment of the present invention.
Figure 8:
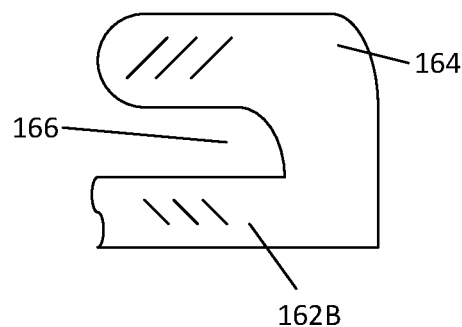
FIG. 8 is a side view of the extension arm of the additional embodiment of FIG. 7
Figure 9:
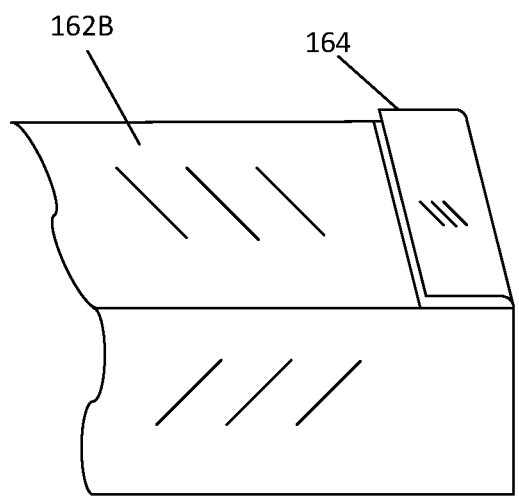
FIG. 9 is a perspective view of the extension arm of the additional embodiment of the extension arm of FIG. 7.

FIGS. 7-9 illustrate an additional embodiment of extension arm 160. Extension arm 160 has two legs 162A, 162B in an L-shaped configuration along with an end securing hook 164 that extend along end edge of leg 162A at the distal end of extension arm 160. End securing hook 164 and leg 162A form a strap channel 166. In operation securing strap 14 is placed within strap channel 166 to provide additional stabilization and securing of container 14. In this embodiment, only one extension arm was illustrated to include end securing hook 164. This is illustrative and not meant to be limiting. Those skilled in the art will recognize that one or more extension arms may include end securing hook 164, as illustrated in FIG. 11.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

I claim:

1. A container securing apparatus for containers having four side walls and two end walls with the side walls and end walls meeting at edges that intersect at eight corners with each corner being the convergence of three edges, the apparatus comprising:

a container stabilizing base being positioned about and against one of the eight corners, the container stabilizing base having a first L-shaped arm extending along a first edge created by a first set of two adjacent container walls, the first L-shaped arm having a first leg and a second leg in an L-shaped configuration, the first leg configured to be positioned against one of the first set of two adjacent container walls, the second leg configured to be positioned against the second of the first set of two adjacent container walls, a second L-shaped arm extending along a second edge created by a second set of two adjacent container walls where one of second set of two adjacent container walls is one of the first set of two adjacent container walls, the second L-shaped arm having a third leg and a fourth leg in an L-shaped configuration, the third leg configured to be positioned against one of the second set of two adjacent container walls, the fourth leg configured to be positioned against the second of the second set of two adjacent container walls, a third L-shaped arm extending along a third edge created by a third set of two adjacent container walls where one of third set of two adjacent container walls is one of the first set of two adjacent container walls, the third L-shaped arm having a fifth leg and a sixth leg in an L-shaped configuration, the fifth leg configured to be positioned against one of the third set of two adjacent container walls, the sixth leg configured to be positioned against the second of the third set of two adjacent container walls, the first, second and third L-shaped arms interconnected such the container stabilizing base in positioned about and against one of the eight corners; and a strap securing base affixed to the container stabilizing base, the strap securing base having a plurality of guide walls extending along opposing peripheral edges of the strap securing base to define a strap receiving channel together with the strap securing base for receiving a securing strap.

2. The container securing apparatus of claim 1 wherein said strap securing base is formed from a rigid plastic.

3. The container securing apparatus of claim 1 wherein the angle between the first and second legs is approximately 90°, the angle between the third and fourth legs is approximately 90°, the angle between the fifth and sixth legs is approximately 90°.

4. The container securing apparatus of claim 1 wherein
the first L-shaped arm is perpendicular to the second L-shaped arm,
the second L-shaped arm is perpendicular to the third L-shaped arm, and
the third L-shaped arm is perpendicular to the first L-shaped arm.

5. The container securing apparatus of claim 1 wherein the strap securing base is further defined as being affixed to one leg of the first L-shaped arm.

6. The container securing apparatus of claim 1 wherein one of the first and second legs further comprises a first end securing hook an end edge at a distal end of the first extension arm, the first end securing hook forming a strap channel.

7. The container securing apparatus of claim 1 wherein one of the third and fourth legs further comprises a second end securing hook an end edge at a distal end of the second extension arm, the second end securing hook forming a strap channel.

8. The container securing apparatus of claim 1 wherein one of the fifth and sixth legs further comprises a third end securing hook an end edge at a distal end of the third extension arm, the third end securing hook forming a strap channel.

* * * * *